United States Patent
Kim et al.

(10) Patent No.: US 10,924,656 B2
(45) Date of Patent: Feb. 16, 2021

(54) ELECTRONIC DEVICE FOR IMAGE GENERATION, AND STORAGE MEDIUM

(71) Applicant: Samsung Electronics Co., Ltd., Suwon-si (KR)

(72) Inventors: Il-Do Kim, Suwon-si (KR); Soon-Geun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/340,216

(22) PCT Filed: Oct. 16, 2017

(86) PCT No.: PCT/KR2017/011408
§ 371 (c)(1),
(2) Date: Apr. 8, 2019

(87) PCT Pub. No.: WO2018/074795
PCT Pub. Date: Apr. 26, 2018

(65) Prior Publication Data
US 2020/0045236 A1   Feb. 6, 2020

(30) Foreign Application Priority Data
Oct. 20, 2016 (KR) .................. 10-2016-0136478

(51) Int. Cl.
*H04N 5/232* (2006.01)
(52) U.S. Cl.
CPC .............. *H04N 5/232122* (2018.08)
(58) Field of Classification Search
CPC .............................................. H04N 5/232122

USPC ........................................................ 348/222.1
See application file for complete search history.

(56) References Cited

U.S. PATENT DOCUMENTS

| | | | |
|---|---|---|---|
| 9,848,116 B2* | 12/2017 | Shimokawa | ....... H04N 5/23212 |
| 2003/0222262 A1 | 12/2003 | Oda et al. | |
| 2011/0164258 A1 | 7/2011 | Nakamura | |
| 2011/0205388 A1* | 8/2011 | Iwane | ................. H04N 5/23235 348/222.1 |
| 2013/0044256 A1 | 2/2013 | Hiasa et al. | |
| 2013/0128087 A1 | 5/2013 | Georgiev et al. | |

(Continued)

FOREIGN PATENT DOCUMENTS

| EP | 2 908 515 A1 | 8/2015 |
|---|---|---|
| JP | 05-122612 A | 5/1993 |

(Continued)

OTHER PUBLICATIONS

European Search Report dated Jun. 5, 2020; European Application No. 17 862 266.8-1209.

(Continued)

*Primary Examiner* — Joel W Fosselman
(74) *Attorney, Agent, or Firm* — Jefferson IP Law, LLP

(57) ABSTRACT

According to various embodiments, an electronic device can comprise: a camera including groups of photoelectric conversion elements; and at least one processor configured so as to generate, by using the camera, a first image in which each of the groups corresponds to one corresponding pixel, determine whether a preset condition is satisfied, and generate, by using the camera, a second image in which each of the groups corresponds to a plurality of corresponding pixels, if the preset condition is satisfied.

10 Claims, 10 Drawing Sheets

(56) References Cited

U.S. PATENT DOCUMENTS

2015/0036014 A1    2/2015   Lelescu et al.
2015/0248967 A1    9/2015   Oki
2015/0264333 A1    9/2015   Ishiga
2015/0312461 A1   10/2015   Kim et al.
2016/0028983 A1    1/2016   Uya et al.

FOREIGN PATENT DOCUMENTS

| | | |
|---|---|---|
| JP | 2003-304456 A | 10/2003 |
| JP | 2005-156768 A2 | 6/2005 |
| JP | 2009-171559 A2 | 7/2009 |
| JP | 2010-015241 A2 | 1/2010 |
| JP | 2013-009051 A2 | 1/2013 |
| JP | 2013-042443 A2 | 2/2013 |
| JP | 2013-197841 A2 | 9/2013 |
| JP | 2015-064909 A2 | 4/2015 |
| JP | 2016-025334 A | 2/2016 |
| KR | 10-2015-0124367 A | 11/2015 |

OTHER PUBLICATIONS

European Search Report dated Sep. 26, 2019, issued in European Patent Application No. 17862266.8.

* cited by examiner

ELECTRONIC DEVICE FOR IMAGE GENERATION, AND STORAGE MEDIUM

CROSS-REFERENCE TO RELATED APPLICATION(S)

This application is a U.S. National Stage application under 35 U.S.C. § 371 of an International application number PCT/KR2017/011408, filed on Oct. 16, 2017, which is based on and claimed the priority of a Korean patent application number 10-2016-0136478, filed on Oct. 20, 2016, in the Korean Intellectual Property Office, the disclosure of which is incorporated by reference herein in its entirety.

TECHNICAL FIELD

The disclosure generally relates to an electronic device that generates an image and an image generation method.

BACKGROUND ART

An image sensor is a device for converting an optical image into an electric signal. Generally, image sensors may include a charge coupled device (CCD) type of image sensor and a CMOS type of image sensor (CIS). An image sensor may include a plurality of pixels, and each pixel may output a pixel signal corresponding to an incident light. Each of the plurality of pixels may accumulate a photocharge corresponding to an incident light via a photoelectric conversion element (e.g., a photo diode), and may output a pixel signal on the basis of the accumulated photocharge.

DETAILED DESCRIPTION OF THE INVENTION

Technical Problem

In the case of a phase auto focus (PAF) pixel, a pixel of an image sensor includes a plurality of photoelectric conversion elements and thus, a resolution corresponding to the number of photoelectric conversion elements may not be obtained.

Therefore, there is a desire for a method of obtaining resolution corresponding to the number of photoelectric conversion elements.

Technical Solution

In accordance with an aspect of the disclosure, an electronic device may include a camera including groups of photoelectric conversion elements; and at least one processor, which is configured to perform: generating, using the camera, a first image in which each of the groups corresponds to a corresponding pixel; determining whether a predetermined condition is satisfied; and if the predetermined condition is satisfied, generating, using the camera, a second image in which each of the groups corresponds to a plurality of corresponding pixels.

In accordance with an aspect of the disclosure, a storage medium storing instructions is provided. The instructions are configured to enable at least one processor to perform at least one operation when the instructions are executed by the at least one processor, the at least one operation including: generating, using a camera, a first image in which each of groups of photoelectric conversion elements corresponds to a corresponding pixel; determining whether a predetermined condition is satisfied; and if the predetermined condition is satisfied, generating, using the camera, a second image in which each of the groups corresponds to a plurality of corresponding pixels.

Advantageous Effects

According to various embodiments, there is provided a method of obtaining a resolution corresponding to the number of photoelectric conversion elements.

According to various embodiments, there is provided a method of switching to a desired resolution according to a condition.

A normal image sensor may provide a high resolution of 20M pixel using 20M photodiodes, but may be incapable of implementing fast AF, such as a PAF. When an image sensor is implemented using PAF pixels, the image sensor may implement fast AF but may provide a low resolution of 10M pixel with 20M photodiodes.

According to various embodiments, fast AF of the PAF is implemented and a high resolution of 20M pixel is obtained using 20M photodiodes.

MODE FOR CARRYING OUT THE INVENTION

Figure 1:
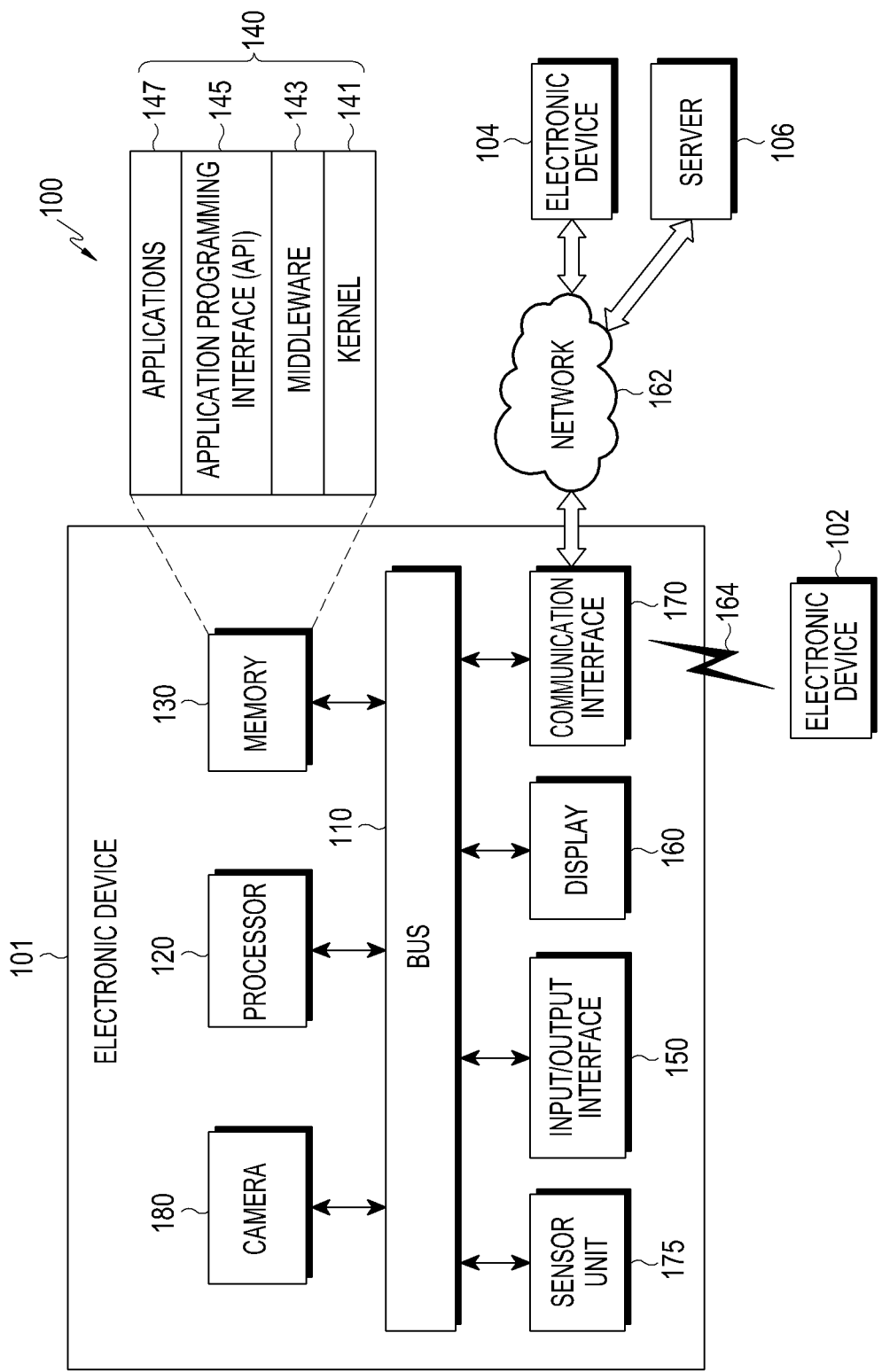
FIG. 1 is a diagram illustrating an electronic device within a network environment according to various embodiments.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. In the present disclosure, the expression "A or B," "A/B," or "at least one of A and/or B" may include all possible combinations of the items listed. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element). The expression "plural" may mean at least two The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, or the like). In various embodiments, the electronic device may be flexible, or may be a combination of one or more of the aforementioned various devices. The electronic device according to embodiments of the disclosure is not limited to the above-described devices. In the disclosure, the term "user" may indicate a person using an electronic device or a device (e.g., an artificial intelligence electronic device) using an electronic device.

Referring to FIG. 1, an electronic device 101 within a network environment 100 according to various embodiments will be described. The electronic device 101 may include a bus 110, a processor 120, a memory 130, an input/output interface 150, a display 160, a communication interface 170, a sensor unit 175, and a camera 180. In some embodiments, the electronic device 101 may omit at least one of the elements, or may further include other elements. The bus 110 may include, for example, a circuit that interconnects the elements 110 to 180 and transmits communication (e.g., control messages or data) between the elements. The processor 120 may include one or more of a central processing unit, an application processor, and a communication processor (CP). The processor 120, for example, may carry out operations or data processing relating to control and/or communication of at least one other element of the electronic device 101.

The memory 130 may include a volatile and/or a non-volatile memory. The memory 130 may store, for example, instructions or data relevant to at least one other element of the electronic device 101. According to an embodiment, the memory 130 may store software and/or a program 140. For example, the program 140 may include a kernel 141, middleware 143, an application programming interface (API) 145, and/or application programs (or "applications") 147. At least some of the kernel 141, the middleware 143, and the API 145 may be referred to as an operating system. The kernel 141 may control or manage system resources (e.g., the bus 110, the processor 120, or the memory 130) used for executing an operation or function implemented by other programs (e.g., the middleware 143, the API 145, or the application 147). Furthermore, the kernel 141 may provide an interface via which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priories to use the system resources (e.g., the bus 110, the processor 120, the memory 130, or the like) of the electronic device 101 to one or more of the application programs 147, and may process the one or more task requests. The API 145 is an interface via which the applications 147 control functions provided from the kernel 141 or the middleware 143, and may include, for example, at least one interface or function (e.g., instruction) for file control, window control, image processing, or text control. For example, the input/output interface 150 may transmit commands or data input from a user or an external device to the other element(s) of the electronic device 101, or may output commands or data received from the other element(s) of the electronic device 101 to the user or an external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of content (e.g., text, images, videos, icons, and/or symbols) for a user. The display 160 may include a touch screen and may receive, for example, a touch, gesture, proximity, or hovering input using an electronic pen or a user's body part. The communication interface 170 may establish, for example, communication between the electronic device 101 and an external device (e.g., a first external electronic device 102, a second external electronic device 104, or a server 106). For example, the communication interface 170 may be connected to a network 162 via wireless or wired communication to communicate with an external device (e.g., the second external electronic device 104 or the server 106).

The wireless communication may include, for example, a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, Bluetooth, Bluetooth low energy (BLE), ZigBee, near field communication (NFC), magnetic secure transmission, radio frequency (RF), or body area network (BAN). According to an embodiment, the wireless communication may include a GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a universal serial bus (USB), a high definition multimedia interface (HDMI), recommended standard 232 (RS-232), power line communication, a plain old telephone service (POTS), or the like. The network 162 may include a telecommunications network, for example, at least one of a computer network (e.g., a LAN or a WAN), the Internet, or a telephone network.

Each of the first and second external electronic devices 102 and 104 may be of a type that is the same or different from that of the electronic device 101. According to various embodiments, the whole or a part of the operations executed in the electronic device 101 may be executed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of, or in addition to, performing the functions or services by itself. Another electronic device (e.g., the electronic device 102 or 104, or the server 106) may execute the requested functions or the additional functions, and may transmit a result thereof to the electronic device 101. The electronic device 101 may provide the received result as it is, or may additionally process the received result to provide the requested functions or services. To this end, for example, cloud computing, distributed computing, or client-server computing technology may be used.

The sensor unit 175 may include at least one sensor for detecting the state of the electronic device 101 or an ambient environment state. For example, the sensor unit 175 may include at least one of a proximity sensor for detecting whether a user approaches the electronic device 101, a motion/orientation sensor for detecting an operation of the electronic device 101 (e.g., the rotation, acceleration, deceleration, vibration, or the like of the electronic device 101), or an illumination sensor for detecting an ambient illumination. Also, the motion/orientation sensor may include at least one of an acceleration sensor, a gravity sensor, a geomagnetic sensor, a gyro sensor, a shock sensor, a GPS module, or a compass sensor. The sensor unit 175 may detect the state of the electronic device 101 and may transmit a signal indicating the state of the electronic device 101 to the processor 120. For example, the GPS module may receive radio waves from a plurality of GPS satellites (not illustrated) in Earth orbit, and may calculate the location of the electronic device 101 by using a time of arrival of the radio waves from the GPS satellites (not illustrated) to the electronic device 101. The compass sensor detects a posture or an orientation of the electronic device 101.

The camera 180 may take a shot of a subject, and may output an image of the subject. The display 160 may display an image input by a camera or the processor 120.

According to an embodiment, the processor 120 may include an image signal processor (ISP) that processes an image output by the camera 180.

Figure 2:
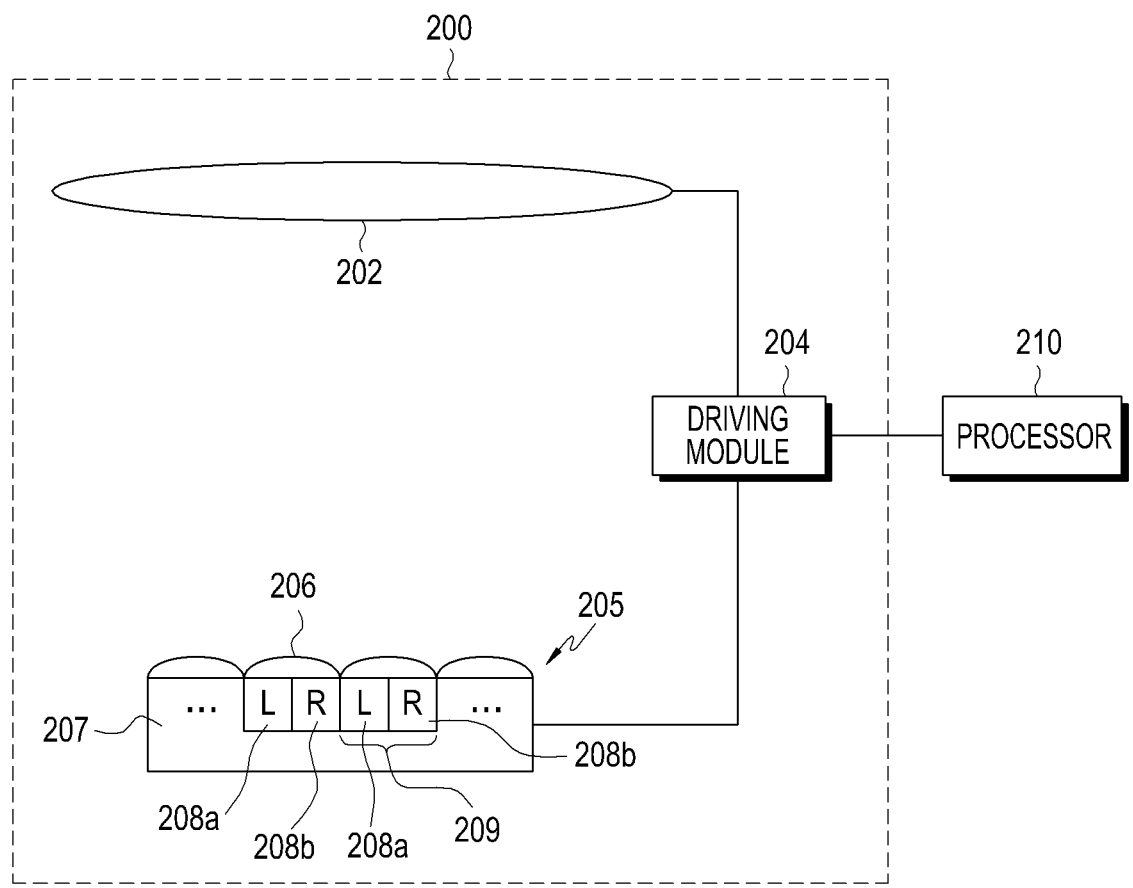
FIG. 2 is a diagram illustrating a camera according to various embodiments.

FIG. 2 is a diagram illustrating a camera according to various embodiments.

A camera 200 (e.g., the camera 180) may include a main lens 202, a driving module 204, and an image sensor 205.

According to an embodiment, the main lens 202 may be replaced with a plurality of lenses, or may correspond to one of the plurality of lenses. According to an embodiment, the main lens 202 may be disposed at the end (part) of the camera 200 which faces the outside.

The image sensor 205 may include groups 209 of photoelectric conversion elements 208a and 208b, and a plurality of micro-lenses 206, and there is a one-to-one correspondence relationship between the groups 209 and the plurality of micro-lenses 206.

For example, the group 209 may include a first photoelectric conversion element 208a (or an odd-numbered (or left) photoelectric conversion element L) and a second photoelectric conversion element 208b (or an even-numbered (or right) photoelectric conversion element R). The photoelectric conversion elements 208a and 208b may be disposed in a substrate 207.

The driving module 204 may be electrically connected to a processor 210 (e.g., the processor 120). The processor 210 may transmit an electric signal for controlling the driving module 204 to the driving module 204. The driving module 204 may adjust (control) the location of the main lens 202 on the basis of the received electric signal. The driving module 204 may include, for example, an actuator. The driving module 204 may include a motor for providing driving force, and a guide that moves the main lens 202 back and forth along an optical axis by the driving force. At least a part of the various elements illustrated in FIG. 2 may be configured separately from the camera 200.

According to various embodiments, an electronic device (e.g., the electronic device 101) may include: a camera (e.g., the camera 180 or 200) including groups of photoelectric conversion elements; and at least one processor (e.g., the processor 120 or 210), which is configured to perform: generating, using the camera, a first image in which each of the groups corresponds to a corresponding pixel; determining whether a predetermined condition is satisfied; and if the predetermined condition is satisfied, generating, using the camera, a second image in which each of the groups corresponds to a plurality of corresponding pixels.

According to various embodiments, the at least one processor is configured to perform: generating a third image or a fourth image which is in a defocus state; and generating the second image based on the third image or the fourth image (i.e., only a single image in the defocus state).

According to various embodiments, the at least one processor is configured to perform: determining the value of an odd-numbered pixel of at least a part of the third or fourth image which corresponds to a first photoelectric conversion element of each group to be the value of an odd-numbered pixel of the second image and determining the value of an even-numbered pixel of at least a part of the third or fourth image which corresponds to a second photoelectric conversion element of each group to be the value of an even-numbered pixel of the second image, based on depth information of a subject included in the third or fourth image (i.e., only a single image in the defocus state).

According to various embodiments, the at least one processor may determine the value of an even-numbered pixel of at least a part of the third or fourth image (i.e., only a single image in the defocus state) corresponding to a second photoelectric conversion element of each group to be the value of an odd-numbered pixel of the second image, and may determine the value of an odd-numbered pixel of at least a part of the third or fourth image which corresponds to a first photoelectric conversion element of each group to be the value of an even-numbered pixel of the second image.

According to various embodiments, the at least one processor may be configured to determine the value of an odd-numbered (even-numbered) pixel of a part of the third or fourth image to be the value of an odd-numbered (even-numbered) pixel of the second image, and may determine the value of an even-numbered (odd-numbered) pixel of another part of the third or fourth image to be the value of another odd-numbered (even-numbered) pixel of the second image, on the basis of depth information of a subject included in the third or fourth image.

According to various embodiments, the at least one processor is configured to perform: generating a third image in a defocus state; generating a fourth image in a defocus state; and generating the second image based on the third image and the fourth image.

According to various embodiments, the at least one processor is configured to generate an odd-numbered (even-numbered) pixel of the second image on the basis of odd-numbered (even-numbered) pixels of the third image which correspond to a first photoelectric conversion element (second photoelectric conversion element) of each group and even-numbered (odd-numbered) pixels of the fourth image which correspond to a second photoelectric conversion element (first photoelectric conversions element) of each group.

According to various embodiments, the at least one processor is configured to generate a third pixel of the second image on the basis of a first pixel of the third image which corresponds to a first photoelectric conversions element of a first group among the groups and a second pixel of the fourth image which corresponds to a second photoelectric conversions element of the first group.

According to various embodiments, the defocus location of the third image and the defocus location of the fourth image are symmetric about an on-focus location.

According to various embodiments, the absolute value of the amount of defocus of the first image from an on-focus state and the absolute value of the amount of defocus of the second image from the on-focus state are the same.

Figure 3A:
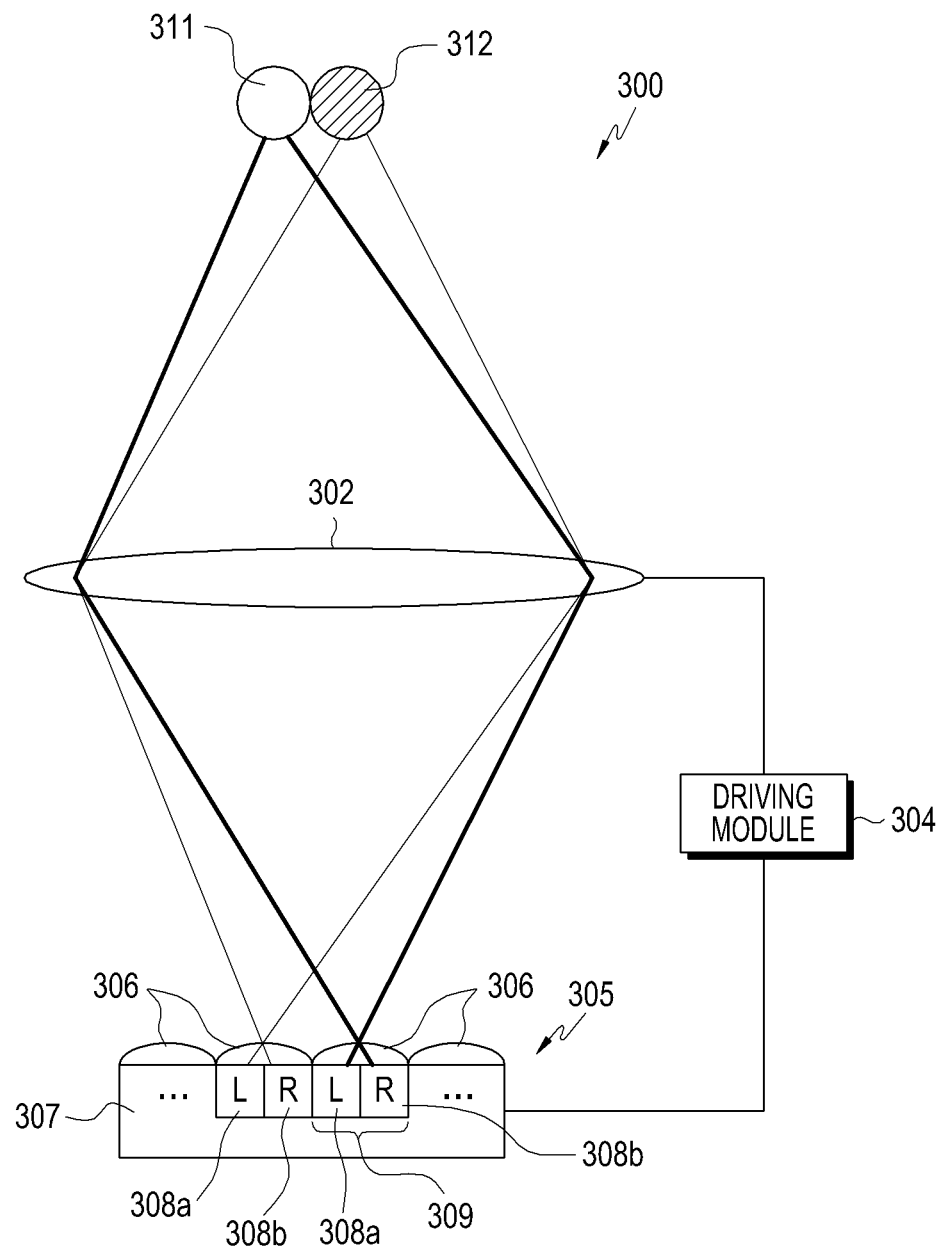
FIGS. 3A and 3B are diagrams illustrating an on-focus state and a defocus state according to various embodiments.
Figure 3B:
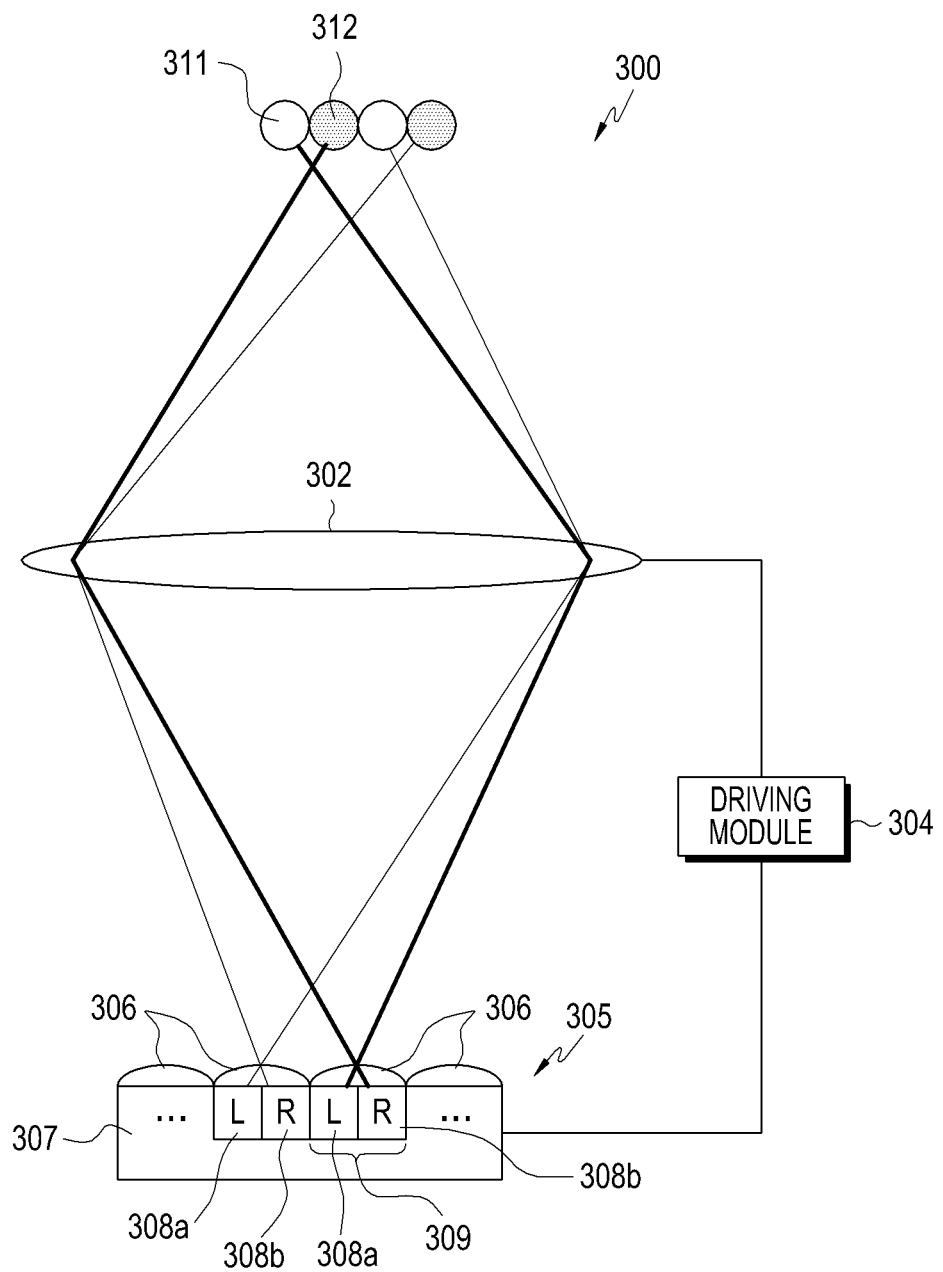

FIGS. 3A and 3B are diagrams illustrating an on-focus state (i.e., being in focus) and a defocus state (i.e., being out of focus) according to various embodiments. FIG. 3A illustrates an optical path in the on-focus state, and FIG. 3B illustrates an optical path in the defocus state. The term "on-focus" indicates the case in which a pixel disparity is 0 when an image of a predetermined object is obtained. The term "defocus" indicates the case in which a pixel disparity is not 0.

Referring to FIG. 3A, photoelectric conversion elements 308a and 308b of each group 309 of an image sensor 305 according to various embodiments may receive light reflected from an object 311 or 312. Light may be received via a main lens 302 and a micro-lens 306. In the on-focus state as illustrated in FIG. 3A, a first photoelectric conversion element 308a (or an odd-numbered (or left) photoelectric conversion element L) and a second photoelectric conversion element 308b (or even-numbered (or right) photoelectric conversion element R) corresponding to one micro-lens 306 may receive light reflected from the same object 311 or 312. However, referring to FIG. 3B, in the defocus state, the first photoelectric conversion element 308a and the second photoelectric conversion element 308b corresponding to the one micro-lens 306 may receive light reflected from different objects 311 and 312. As described above, the main-lens 302 may be connected to a driving module 304.

The processor 210 may perform an auto-focus operation using the camera 200. In the auto-focus operation, the group 209 may function as a phase auto focus (PAF) pixel. The PAF pixel may include two or more photoelectric conversion elements 208a and 208b.

For example, in the case of taking a shot of the boundary between the white object 311 and the black object 312, the first photoelectric conversion element 308a and the second photoelectric conversion element 308b may output detection values corresponding to grey in the on-focus state. In the case of taking a shot of the boundary between the white object 311 and the black object 312, the first photoelectric conversion element 308a and the second photoelectric conversion element 308b may output a detection value corresponding to while (or black) and a detection value corresponding to black (or white), respectively, in the defocus state. The processor 210 may promptly and accurately calculate the focus location of the main lens 302 using the difference between the detection values.

Figure 4:
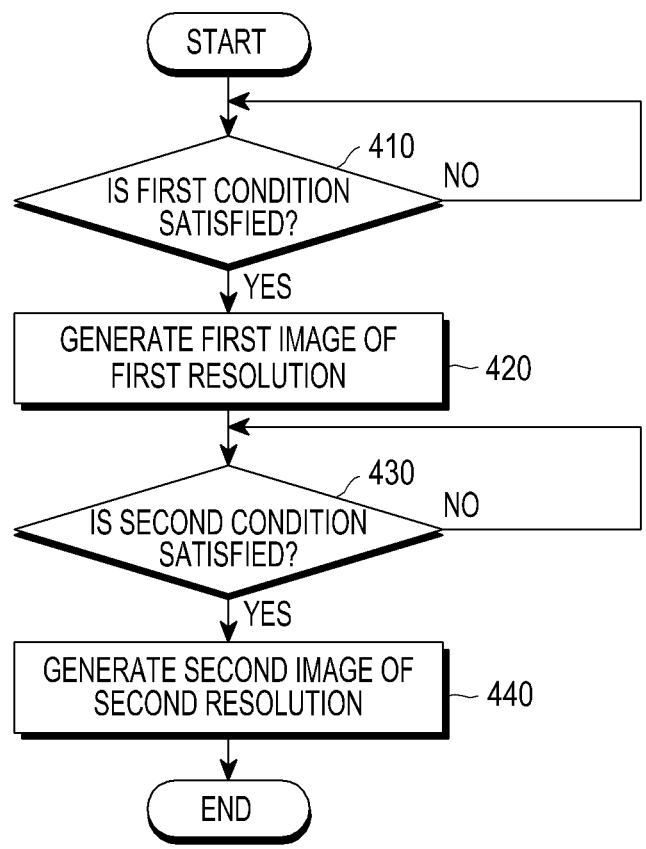
FIG. 4 is a flowchart illustrating an image generation method by an electronic device according to various embodiments.

FIG. 4 is a flowchart illustrating an image generation method by an electronic device according to various embodiments. The image generation method may include operations 410 to 440. The image generation method may be performed by at least one from among the electronic device (e.g., the electronic device 101), at least one processor (e.g., the processor 120 or 210) of the electronic device, or a controller of the electronic device.

In operation 410, the electronic device may determine whether a predetermined first condition is satisfied.

When the first condition is satisfied, the electronic device may perform operation 420. When the first condition is not satisfied, the electronic device may periodically or aperiodically determine whether the first condition is satisfied.

According to an embodiment, the first condition may include at least one from among detection of a predetermined context associated with the electronic device, execution of a camera application, selection of a graphic element (or item) (e.g., a button, an icon, a menu, or a menu item) that requires a camera to operate, reception of a command that requests operation of a camera, or user input/command (e.g., a command to shoot a still image/video).

According to an embodiment, the predetermined context of the electronic device may include at least one of a case where the electronic device is located or arrives at a predetermined area/place, a case where a predetermined time arrives, a case where the electronic device operates according to a predetermined operation pattern (e.g., execution of application(s)), and a case where a current state of the electronic device (e.g., at least one of a battery state, a wireless signal reception state, a memory state, or the like) matches a predetermined state.

According to an embodiment, the predetermined context associated with the electronic device may be determined on the basis of usage history information of the electronic device (e.g., the history/frequency/number of times that a camera application is executed at a predetermined place/time or the history/frequency/number of times that a camera application operates in a low-resolution mode at a predetermined place/time).

In operation 420, when the first condition is satisfied, the electronic device may generate a first image of a first resolution (or low-resolution (or high-resolution) using a camera (e.g., the camera 180, 200, or 300). The camera may include groups of photoelectric conversion elements. The electronic device may generate the first image in which each of the groups corresponds to a corresponding pixel (or in which a one-to-one correspondence relationship exists between the groups and the pixels of the first image). In the on-focus state (or in the state in which the main lens 202 or 302 is disposed in a first location (or an on-focus location), the electronic device may generate the first image by taking a shot of a subject existing around the electronic device using the camera.

According to an embodiment, the electronic device may display the first image on a display (e.g., the display 160) of the electronic device. For example, the electronic device may display the first image on the display of the electronic device, in response to a user input or automatically (or at the same time at which the first image is shot).

In operation 430, the electronic device may determine whether a predetermined second condition is satisfied.

When the second condition is satisfied, the electronic device may perform operation 440. When the first condition is not satisfied, the electronic device may periodically or aperiodically determine whether the second condition is satisfied.

According to an embodiment, operations 410 and 420 may be omitted.

According to an embodiment, the electronic device may perform operation 430 when the first condition is not satisfied.

According to an embodiment, the electronic device may perform operation 410 or 420 when the second condition is not satisfied.

According to an embodiment, the predetermined second condition may include at least one from among execution of an application including a graphic element (or item) (e.g., a button, an icon, a menu, or a menu item) that requires a camera to operate, displaying of a screen including a graphic element that requires a camera to operate, user's access to a graphic element that requires a camera to operate, detection of a context associated with an electronic device which matches a predetermined context, detection of at least one word that matches at least one predetermined word, or user input/command (e.g., a command to shoot a still image/video, a command to change resolution, or a command to change a mode related to resolution).

According to an embodiment, the predetermined context of the electronic device may include at least one of a case where the electronic device is located or arrives at a predetermined area/place, a case where a predetermined time arrives, a case where the electronic device operates according to a predetermined operation pattern (e.g., execution of application(s)), or a case where a current state of the electronic device (e.g., at least one of a battery state, a wireless signal reception state, a memory state, or the like) matches a predetermined state.

According to an embodiment, the predetermined context associated with the electronic device may be determined on the basis of usage history information of the electronic device (e.g., the history/frequency/number of times that a camera application operates in a high-resolution mode at a predetermined place/time).

In operation 440, the electronic device may generate a second image of a second resolution (or high resolution (or low resolution)) using the camera when the second condition is satisfied. The electronic device may generate the second image in which each of the groups correspond to a plurality of corresponding pixels (or a one-to-many correspondence relationship exists between the groups and the pixels of the second image, or a one-to-one correspondence relationship exists between all of the photoelectric conversion elements of each group and the pixels of the second image).

According to an embodiment, a subject of the first image and a subject of the second image may be the same.

According to an embodiment, in a first defocus state (or in the state in which the main lens 202 or 302 is disposed in a second location (or a first defocus location)), the electronic device may generate a third image by taking a shot of a subject existing around the electronic device using the camera. The electronic device may generate the second image on the basis of the third image. For example, the electronic device may determine the value of an even-numbered (or an odd-numbered) pixel of at least a part of the third image corresponding to a second (first) photoelectric conversion element of each group to be the value of an odd-numbered (an even-numbered) pixel of the second image. For example, each pixel value of the third image and the value of a corresponding pixel of the second image may correspond to the same point of the same subject.

According to an embodiment, the electronic device may determine the value of an even-numbered (odd-numbered) pixel of a part of the third image to be the value of an odd-numbered (even-numbered) pixel of the second image, and may determine the value of an odd-numbered (even-numbered) pixel of another part of the third image to be the value of another odd-numbered (even-numbered) pixel of the second image, on the basis of depth information of the third image.

According to an embodiment, in a second defocus state (or in the state in which the main lens 202 is disposed in a third location (or a second defocus location)), the electronic device may generate a fourth image by taking a shot of a subject existing around the electronic device using the camera. For example, the third location (or the second defocus location) and the second location (or the first defocus location) may be symmetrical about the first location (or the on-focus location), or the first location may be located between the second and the third locations. The electronic device may generate the second image on the basis of a fourth image. For example, the electronic device may determine the value of an odd-numbered (or an even-numbered) pixel of the fourth image corresponding to a first (second) photoelectric conversion element of each group to be the value of an odd-numbered (an even-numbered) pixel of the second image. For example, each pixel value of the fourth image and the value of a corresponding pixel of the second image may correspond to the same point of the same subject.

According to an embodiment, the electronic device may determine the value of an odd-numbered (even-numbered) pixel of a part of the fourth image to be the value of an odd-numbered (even-numbered) pixel of the second image, and may determine the value of an even-numbered (odd-numbered) pixel of another part of the fourth image to be the value of another odd-numbered (even-numbered) pixel of the second image, on the basis of depth information of the fourth image.

According to an embodiment, the electronic device may determine the value of an odd-numbered (even-numbered) pixel of a part (e.g., a subject within a predetermined distance range from a predetermined reference location (e.g., the location of an electronic device or camera)) of the third or fourth image to be the value of an odd-numbered (even-numbered) pixel of the second image, and may determine the value of an even-numbered (odd-numbered) pixel of another part (or the other part) (e.g., a subject at a predetermined distance or more from the reference location) of the third or fourth image to be the value of another odd-numbered (even-numbered) pixel of the second image, on the basis of depth information of a subject (or an object) included in the third or fourth image (i.e., only a single image in the defocus state).

According to an embodiment, the electronic device may generate the second image on the basis of the third image and the fourth image. For example, the electronic device may determine the value of a corresponding pixel of the second image on the basis of the value of each pixel (i.e., a each pixel value) of the third image and the value of a corresponding pixel of the fourth image. For example, the electronic device may determine the average value of each pixel value of the third image and a corresponding pixel value of the fourth image, or the weighted average value thereof (the average or sum of two pixel values to which different weights are applied) to be a corresponding pixel value of the second image. For example, each pixel value of the third image, a corresponding pixel value of the fourth image, and a corresponding pixel value of the second image may correspond to the same point of the same subject. For example, the electronic device may determine the average or sum of the value of an odd-numbered (even-numbered) pixel of the third image and the value of an odd-numbered (even-numbered) pixel of the fourth image to be the value of an odd-numbered (even-numbered) pixel of the second image.

According to an embodiment, the electronic device may display the second image on a display (e.g., the display 160) of the electronic device. For example, the electronic device may display the second image on the display of the electronic device, in response to a user input or automatically (or at the same time at which the first image is shot).

Figure 5:
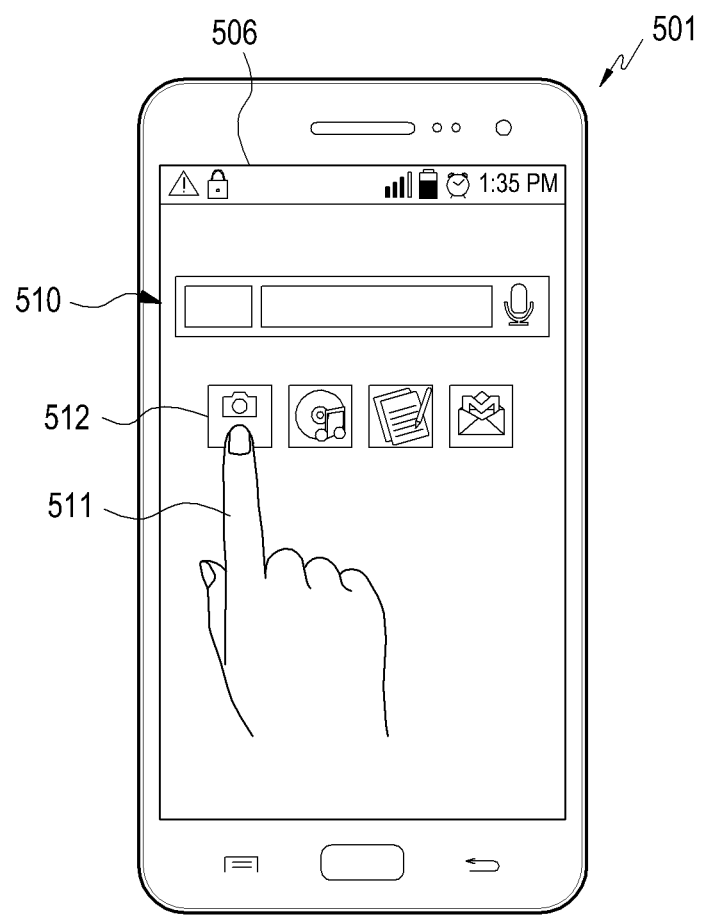
FIGS. 5 to 6 are diagrams illustrating an operation method of an electronic device according to various embodiments.
Figure 6:
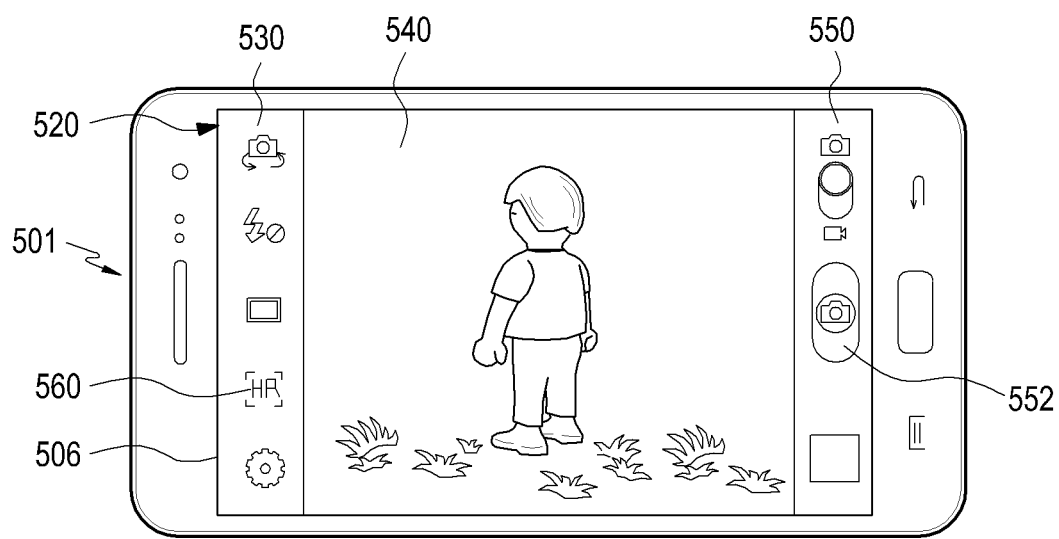

FIGS. 5 to 6 are diagrams illustrating an operation method of an electronic device according to various embodiments.

Referring to FIG. 5, a memory (e.g., the memory 130) of an electronic device 501 (e.g., the electronic device 101) may store a camera application, a voice recognition application, or the like. The electronic device 501 may display a screen 510 (e.g., a home screen) including executable icons which are mapped to applications such as the camera application, the voice recognition application, or the like on a display 506 (e.g., the display 160).

For example, the electronic device 501 may detect an input from a user 511 to select a camera icon 512. Before detecting an input, the electronic device may perform initialization which is needed in order to operate a camera (e.g., the camera 180) in a normal mode. When the initialization is completed, the electronic device may operate the camera in a sleep mode. The electronic device 501 may change the camera from the sleep mode to the normal mode in response to the input. In response to the input, the electronic device 501 may execute the camera application.

According to an embodiment, the electronic device 501 may detect an input that requires execution of the camera application via an input/output interface (e.g., the input/output interface 150), a communication interface (e.g., the communication interface 170), or a sensor unit (e.g., the sensor unit 175). The input may be one of various types of information input to the electronic device 501, such as a user gesture, a user voice, a user biometric signal, or the like.

Referring to FIG. 6, as a camera application is executed, a camera application screen 520 (or a camera application window) may be displayed on the display 506 of the electronic device 501. On the camera application screen 520, a first menu bar 530 including configuration menu items or the like, a second menu bar 550 including a shooting button 552 or the like, and a live preview image 540 may be displayed. For example, the live preview image 540 may include an image of a child which is a subject. As the camera application is executed, the electronic device 501 may control the camera to output the live preview image 540 (e.g., a real-time video) having a relatively low-resolution (or a small number of pixels). The live preview image 540 may not be permanently stored in the memory, but may be temporarily stored for displaying on the display 506 or the like, and may be automatically deleted. The camera may include groups of photoelectric conversion elements. The electronic device 501 may generate the live preview image 540 in which each of groups corresponds to a corresponding pixel (or in which a one-to-one correspondence relationship exists between the groups and the pixels of the first image).

The electronic device 501 may detect that a user selects the shooting button 552 (or a user inputs a command to perform shooting). In response to the selection of the shooting button 552, the electronic device 501 may output an image (e.g., a still image or a video) having a relatively high resolution (or a large number of pixels). The electronic device 501 may store an image having a high-resolution (or an image shot in response to a user input) in a memory, or may display the same on the display 506 in parallel. The image shot in response to the user input may be permanently stored in the memory, and may be deleted in response to a user input. The electronic device 501 may generate an image in which each of the groups correspond to a plurality of corresponding pixels (or a one-to-many correspondence relationship exists between the groups and the pixels of the second image, or a one-to-one correspondence relationship exists between all of the photoelectric conversion elements of each group and the pixels of the second image).

According to an embodiment, the first menu bar 530 may include a high-resolution menu item 560. When the high-resolution menu item 560 is selected, the electronic device 501 may change to a high-resolution mode for outputting an image having a high-resolution (or a large number of pixels) from a low-resolution mode for outputting an image having a low-resolution (or a small number of pixels). For example, the electronic device 501 may output an image having a relatively low-resolution in response to selecting the shooting button 552 in the low-resolution mode. For example, the electronic device 501 may output an image having a relatively high-resolution in response to selecting the shooting button 552 in the high-resolution mode.

Figure 7:
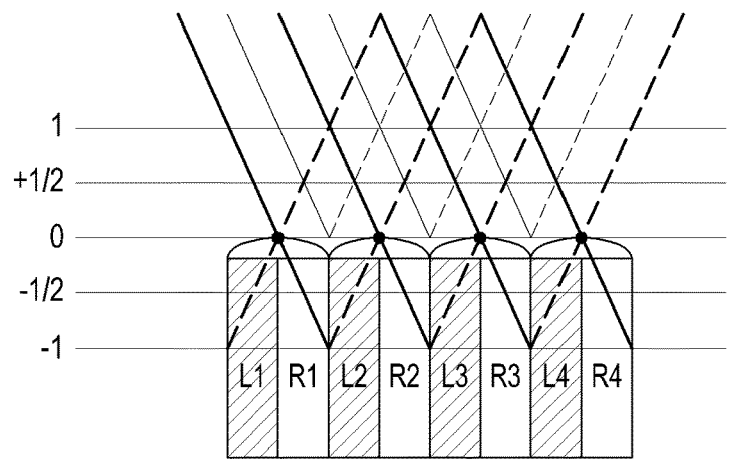
FIG. 7 is a diagram illustrating an operation of receiving light by a group of photoelectric conversion elements in an on-focus state according to various embodiments.

FIG. 7 is a diagram illustrating an operation of receiving light by a group of photoelectric conversion elements in an on-focus state according to various embodiments.

As described above, a pixel disparity is 0 in the on-focus state (or in the state in which a main lens (e.g., the main lens 202 or 302) is disposed in a first location (or an on-focus location). As illustrated in FIG. 7, light focuses and focus exists on an image sensor side. In the on-focus state as described above, light reflected from the same object is received. Accordingly, in a first image, a difference in phase may not exist between image parts obtained by photoelectric conversion elements (L and R).

Figure 8:
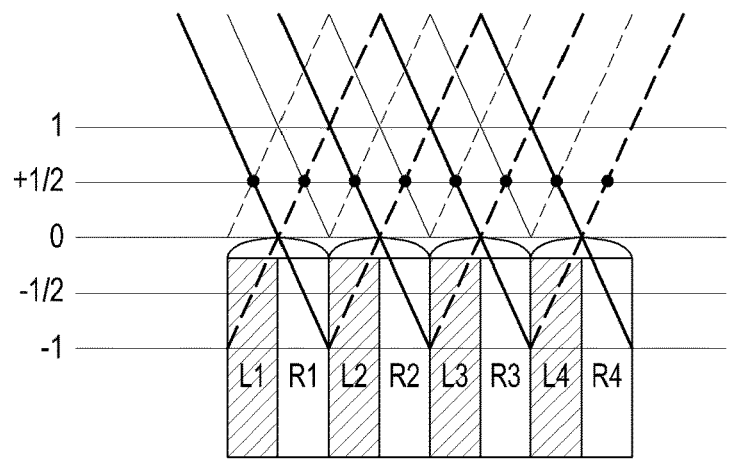
FIG. 8 is a diagram illustrating an operation of receiving light by a group of photoelectric conversion elements in a first defocus state according to various embodiments.

FIG. 8 is a diagram illustrating an operation of receiving light by a group of photoelectric conversion elements in a first defocus state (or the state in which the main lens 202 or 302 is disposed in a second location (or a first defocus location) according to various embodiments.

According to various embodiments, when an input for obtaining an image is received from a user, a processor (e.g., the processor 120 or 210) may control a driving module (e.g., the driving module 204 or 304) such that the location of the main lens (e.g., the main lens 202 or 302) is moved to another location from an on-focus location. The input for obtaining an image may include, for example, a single input provided via an input/output interface (e.g., the input/output interface 150) or a shutter. FIG. 8 illustrates that the main lens is moved such that a focus location for an object is moved by a distance of +0.5 pixels (in other words, a defocus amount) from the focus location in the on-focus state, and the main lens defocuses. The processor may store, in a memory (e.g., the memory 130), data obtained when the main lens is located in the second location (in other words, pixel data associated with a third image).

The processor may control a driving module so as to change a focus location (in other words, an image surface) according to the determined defocus amount (e.g., a distance of +0.5 pixels and a distance of −0.5 pixels).

The third image may include a first pixel array (i.e., a pixel array corresponding to light marked by bold broken lines of FIG. 8) obtained by first photoelectric conversion elements (e.g., photoelectric conversion elements L1, L2, L3, and L4) and a second pixel array (i.e., a pixel array corresponding to light marked by bold solid lines of FIG. 8) obtained by second photoelectric conversion elements (e.g., photoelectric conversion elements R1, R2, R3, and R4). The phase of an image part based on the first pixel array of the third image and the phase of an image part based on the second pixel array may be different from each other. For example, at least a part of the third image may include a pixel array in which the pixel value of a second photoelectric conversion element and the pixel value of a first photoelectric conversion element are arranged repeatedly (e.g., R1, L1, R2, L2, R3, L3, R4, L4, . . . or the like).

According to an embodiment, a part of the third image may include a pixel array in which the pixel value of a second photoelectric conversion element and the pixel value of a first photoelectric conversion element are arranged repeatedly (e.g., R1, L1, R2, L2, R3, L3, R4, L4, . . . , or the like), and another part of the third image may include a pixel array in which the pixel value of a first photoelectric conversion element and the pixel value of a second photoelectric conversion element are arranged repeatedly (e.g., L1, R1, L2, R2, L3, R3, L4, R4, . . . , or the like).

According to various embodiments, the degree of movement or the defocus amount (e.g., a distance of 0.5 pixels or the like) of the main lens which corresponds to a focus location may be stored in the memory in advance. The processor may control the driving module so as to move the location of the main lens, on the basis of information associated with the degree of movement stored in the memory. Alternatively, according to various embodiments, the processor may control the driving module so as to control the location of the main lens according to a distance value (e.g., 0.3 pixels) included in a distance range (e.g., 0 to 0.5 pixels) corresponding to a predetermined focus location.

Figure 9:
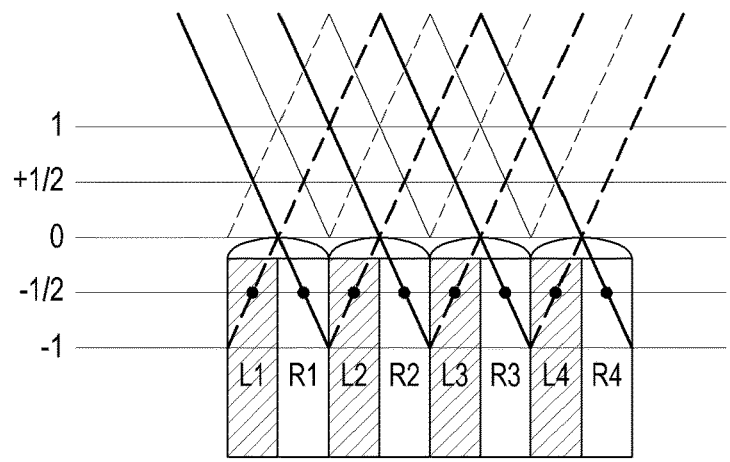
FIG. 9 is a diagram illustrating an operation of receiving light by a group of photoelectric conversion elements in a second defocus state according to various embodiments.

FIG. 9 is a diagram illustrating an operation of receiving light by a group of photoelectric conversion elements in a second defocus state (or in the state in which the main lens 202 is disposed in a third location (or a second defocus location)) according to various embodiments.

After obtaining a third image, the processor may control a driving module to move the main lens such that the focus location for an object is changed to a second focus location (e.g., −0.5 pixels). The processor may store, in a memory, data obtained when the main lens is moved to the third location (in other words, pixel data associated with a fourth image). The fourth image may include a first pixel array (i.e., a pixel array corresponding to light marked by bold broken lines of FIG. 9) obtained by first photoelectric conversion elements (e.g., photoelectric conversion elements L1, L2, L3, and L4) and a second pixel array (i.e., a pixel array corresponding to light marked by bold solid lines of FIG. 9) obtained by second photoelectric conversion elements (e.g., photoelectric conversion elements R1, R2, R3, and R4). The phase of an image part based on the first pixel array of the fourth image and the phase of an image part based on the second pixel array may be different from each other. For example, at least a part of the fourth image may include a pixel array in which the pixel value of a first photoelectric conversion element and the pixel value of a second photoelectric conversion element are arranged repeatedly (e.g., L1, R1, L2, R2, L3, R3, L4, R4, . . . , or the like).

According to an embodiment, a part of the fourth image may include a pixel array in which the pixel value of a first photoelectric conversion element and the pixel value of a second photoelectric conversion element are arranged repeatedly (e.g., L1, R1, L2, R2, L3, R3, L4, R4, . . . , or the like), and another part of the fourth image may include a pixel array in which the pixel value of a second photoelectric conversion element and the pixel value of a first photoelectric conversion element are arranged repeatedly (e.g., R1, L1, R2, L2, R3, L3, R4, L4, . . . , or the like).

Figure 10:
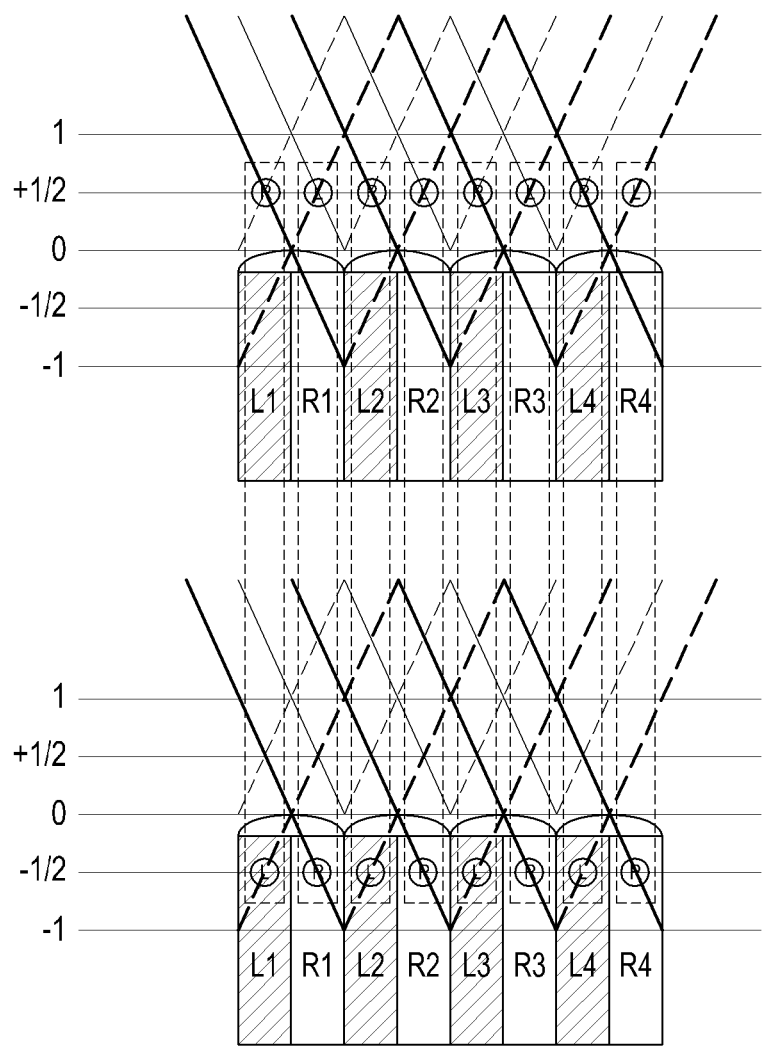
FIG. 10 is a diagram illustrating a function or an operation of generating a second image according to various embodiments.

FIG. 10 is a diagram illustrating a function or an operation of generating a second image according to various embodiments.

A processor (e.g., the processor 210) may generate the second image by at least partially combining/coupling a third image with a fourth image. Referring to FIG. 10, for example, the processor may determine the average value of the sum of the pixel values corresponding to a second pixel array (or an even-numbered pixel array) of the third image and the pixel values corresponding to a first pixel array (or an odd-numbered pixel array) of the fourth image (e.g., (the pixel value corresponding to photoelectric conversion element R1 of the third image+the pixel value corresponding to photoelectric conversion element L1 of the fourth image)/2 of FIG. 10), to be an odd-numbered pixel array of the second image.

The processor may determine the average value of the sum of the pixel values corresponding to a first pixel array (or an odd-numbered pixel array) of the third image and the pixel values corresponding to a second pixel array (or an even-numbered pixel array) of the fourth image (e.g., (the pixel value corresponding to photoelectric conversion element L1 of the third image+the pixel value corresponding to photoelectric conversion element R1 of the fourth image)/2 of FIG. 10), to be an even-numbered pixel array of the second image.

According to an embodiment, the electronic device may determine the pixel values corresponding to a second pixel array (or an even-numbered pixel array) of the third image (e.g., the pixel value corresponding to photoelectric conversion element R1 of the third image) to be an odd-numbered pixel array of the second image, and may determine the pixel values corresponding to a first pixel array (or an odd-numbered pixel array) of the third image (e.g., the pixel value corresponding to photoelectric conversion element L1 of the third image) to be an even-numbered pixel array of the second image. For example, at least a part of the second image may include a pixel array in which the pixel value of a second photoelectric conversion element and the pixel value of a first photoelectric conversion element are arranged repeatedly (e.g., R1, L1, R2, L2, R3, L3, R4, L4, . . . or the like).

According to an embodiment, the electronic device may determine the pixel values corresponding to a first pixel array (or an odd-numbered pixel array) of the fourth image (e.g., the pixel value corresponding to photoelectric conversion element L1 of the fourth image) to be an odd-numbered pixel array of the second image, and may determine the pixel values corresponding to a second pixel array (or an even-numbered pixel array) of the fourth image (e.g., the pixel value corresponding to photoelectric conversion element R1 of the fourth image) to be an even-numbered pixel array of the second image. For example, at least a part of the second image may include a pixel array in which the pixel value of a first photoelectric conversion element and the pixel value of a second photoelectric conversion element are arranged repeatedly (e.g., L1, R1, L2, R2, L3, R3, L4, R4, . . . or the like).

According to an embodiment, on the basis of depth information of a subject (or an object) included in the third or fourth image, the electronic device may determine the pixel values corresponding to a first (second) pixel array (or an odd-numbered (even-numbered) pixel array) of a part of the third or fourth image (e.g., a subject within a predetermined distance range from the electronic device) to be the values of odd-numbered (even-numbered) pixels of the second image, and may determine the pixel values corresponding to a second (first) pixel array (or an even-numbered (odd-numbered) pixel array) of another part (or the remaining part) of the third or fourth image (e.g., a subject at a predetermined distance or more from the electronic device) to be the values of other odd-numbered (even-numbered) pixels of the second image.

According to various embodiments, the second image may be generated using the sum of pixel values (i.e., which is different from the average value of the sum of the pixel values).

The phase of an image part based on the second pixel array of the third image and the phase of an image part based on the first pixel array of the fourth image may be the same, or the phase of an image part based on the first pixel array of the third image and the phase of an image part based on the second pixel array of the fourth image may be the same.

Figure 11:
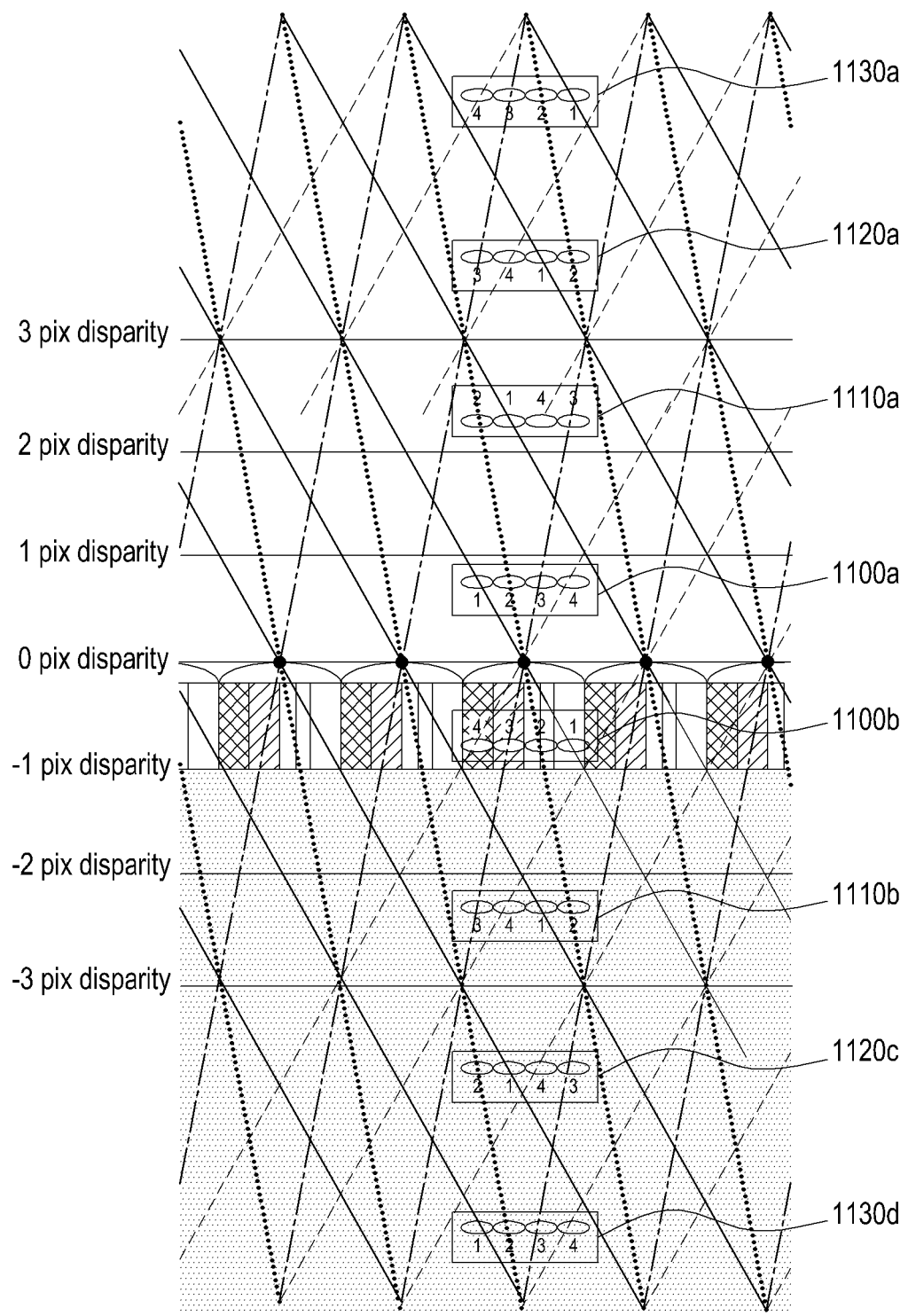
FIG. 11 is a diagram illustrating an operation of receiving light by a group of photoelectric conversion elements when four photoelectric conversion elements are used according to various embodiments.

FIG. 11 is a diagram illustrating an operation of receiving light by a group of photoelectric conversion elements when four photoelectric conversion elements are used according to various embodiments.

According to various embodiments, the number of photoelectric conversion elements included in each group of an image sensor may be 4. In this instance, according to various embodiments, a second image may be obtained by moving the location of a main lens from the location of the main lens corresponding to an on-focus location (i.e., "0 pixel disparity" in FIG. 11), and by combining/coupling an image (e.g., a third image 1100a, 1110a, 1120a, or 1130a) obtained in a location after moving the main lens by a predetermined distance (e.g., +0.75 pixels) and an image (e.g., a fourth image 1100b, 1110b, 1120b, or 1130b) obtained in a location after moving the main lens by a predetermined distance in the negative direction (e.g., −0.75 pixels). According to various embodiments, even though the number of photoelectric conversion elements is 4, at least one pixel array having the same phase may be included (e.g., the pixel data of the third image 1100a obtained by the photoelectric conversion element "1" and the pixel data of the fourth image 1100b obtained by the photoelectric conversion element "4"). Accordingly, by combining/coupling the two pixel arrays, an image having an improved resolution compared to the conventional art may be obtained.

The descriptions associated with the electronic device according to the above-described embodiments may be equally applied to the embodiment of FIG. 11.

According to various embodiments, the term "the location of at least one main lens" (e.g., a first location or the like) may be replaced with the term "the distance between a substrate and a main lens" from the perspective of a distance. In the state in which the substrate is fixed, the at least one main lens may be moved by the driving module. According to various embodiments, the location of the at least one main lens may be fixed, and the location of the substrate may be controlled by the driving module.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter.

The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments, there is provided a storage medium storing instructions, and the instructions are configured to enable at least one processor to perform at least one operation when the instructions are executed by the at least one processor, the at least one operation including: generating, using a camera, a first image in which each of groups of photoelectric conversion elements corresponds to a corresponding pixel; determining whether a predetermined condition is satisfied; and if the predetermined condition is satisfied, generating, using the camera, a second image in which each of the groups corresponds to a plurality of corresponding pixels.

Various embodiments disclosed herein are provided merely to easily describe technical details of the disclosure and to help the understanding of the disclosure, and are not intended to limit the scope of the disclosure. Accordingly, the scope of the disclosure should be construed as including all modifications or various other embodiments based on the technical idea of the disclosure.

The invention claimed is:

1. An electronic device, comprising:
 a camera including a plurality of micro-lenses and groups of photoelectric conversion elements, wherein each of the plurality of micro-lenses corresponds to a group of the groups of photoelectric conversion elements, and wherein each of the groups includes photoelectric conversion elements; and
 at least one processor, which is configured to perform:
  generating, using the camera, a first image of a first resolution in a focus state, and in which each of the groups corresponds to a corresponding pixel in the first image,
  identifying whether a predetermined condition is satisfied, and
  in response to identifying that the predetermined condition is satisfied, generating, using the camera, a third image in a defocus state, generating, using the camera, a fourth image in the defocus state, and generating, using the camera, a second image of a second resolution based on the third image and the fourth image, in which each of the groups corresponds to a plurality of corresponding pixels.

2. The electronic device of claim 1, wherein the at least one processor is further configured to perform:
 determining a value of an odd-numbered pixel of a part of the third or fourth image to be a value of an odd-numbered pixel of the second image and determining a value of an even-numbered pixel of another part of the third or fourth image to be a value of another odd-numbered pixel of the second image, based on depth information of a subject included in the third or fourth image.

3. The electronic device of claim 1, wherein the at least one processor is further configured to perform:
 generating a third pixel of the second image based on a first pixel of the third image which corresponds to a first photoelectric conversion element of a first group among the groups and a second pixel of the fourth image which corresponds to a second photoelectric conversion element of the first group.

4. The electronic device of claim 1, wherein a defocus location of the third image and a defocus location of the fourth image are symmetric about an on-focus location.

5. The electronic device of claim 1, wherein an amount of defocus of the first image and an amount of defocus of the second image are the same in an on-focus state, and
 wherein the predetermined condition comprises at least one of detection of a predetermined context associated with the electronic device, execution of a camera application, selection of a graphic element that requires the camera to operate, or reception of a command requesting operation of the camera.

6. A non-transitory storage medium storing instructions, wherein the instructions are configured to enable at least one processor to perform at least one operation when the instructions are executed by the at least one processor, the at least one operation comprising:
 generating, using the camera, a first image of a first resolution in a focus state, and in which each of the groups corresponds to a corresponding pixel in the first image;
 identifying whether a predetermined condition is satisfied; and
 in response to identifying that the predetermined condition is satisfied, generating, using the camera, a third image in a defocus state, generating, using the camera, a fourth image in the defocus state, and generating, using the camera, a second image of a second resolution based on the third image and the fourth image, in which each of the groups corresponds to a plurality of corresponding pixels,
 wherein each of the groups includes photoelectric conversion elements and is included in a camera,
 wherein each group of the groups of photoelectric conversion elements correspond to a micro-lens of the plurality of micro-lenses, included in the camera.

7. The non-transitory storage medium of claim 6, wherein a value of an odd-numbered pixel of a part of the third or fourth image is determined to be a value of an odd-numbered pixel of the second image and a value of an even-numbered pixel of another part of the third or fourth image is determined to be a value of another odd-numbered pixel of the second image, based on depth information of a subject included in the third or fourth image.

8. The non-transitory storage medium of claim 6, wherein a third pixel of the second image is generated based on a first pixel of the third image which corresponds to a first photoelectric conversion element of a first group among the groups and a second pixel of the fourth image which corresponds to a second photoelectric conversion element of the first group.

9. The non-transitory storage medium of claim 6, wherein a defocus location of the third image and a defocus location of the fourth image are symmetrical about an on-focus location.

10. The non-transitory storage medium of claim 6, wherein an absolute value of an amount of defocus of the first image from an on-focus state and an absolute value of an amount of defocus of the second image from the on-focus state are the same, and
   wherein the second condition comprises at least one of detection of a predetermined context associated with the electronic device, execution of a camera application, selection of a graphic element that requires the camera to operate, or reception of a command requesting operation of the camera.

* * * * *